United States Patent
Wang et al.

(10) Patent No.: US 10,204,079 B2
(45) Date of Patent: Feb. 12, 2019

(54) METHOD AND APPARATUS FOR DISPLAYING AN EXTENDED FUNCTION INFORMATION AREA

(71) Applicant: Tencent Technology (Shenzhen) Company Limited, Shenzhen (CN)

(72) Inventors: Xi Wang, Shenzhen (CN); Bo Hu, Shenzhen (CN); Zhipei Wang, Shenzhen (CN); Tingyong Tang, Shenzhen (CN); Ruiyi Zhou, Shenzhen (CN); Zhengkai Xie, Shenzhen (CN); Ying Huang, Shenzhen (CN); Wei Li, Shenzhen (CN); Cheng Feng, Shenzhen (CN); Kai Zhang, Shenzhen (CN); Huijiao Yang, Shenzhen (CN); Yulei Liu, Shenzhen (CN); Xin Qing, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 606 days.

(21) Appl. No.: 14/528,831

(22) Filed: Oct. 30, 2014

(65) Prior Publication Data
US 2015/0074517 A1    Mar. 12, 2015

Related U.S. Application Data

(63) Continuation of application No. PCT/CN2014/075100, filed on Apr. 10, 2014.

(30) Foreign Application Priority Data

Apr. 15, 2013    (CN) .......................... 2013 1 0129381

(51) Int. Cl.
*G06F 17/21*    (2006.01)
*G06F 3/0481*   (2013.01)
(Continued)

(52) U.S. Cl.
CPC .......... *G06F 17/212* (2013.01); *G06F 3/0481* (2013.01); *G06F 3/0483* (2013.01);
(Continued)

(58) Field of Classification Search
CPC . G06F 17/212; G06F 3/0481; G06F 17/30899
See application file for complete search history.

(56) References Cited

U.S. PATENT DOCUMENTS

2012/0173659 A1*  7/2012  Thaxter ............... G06F 15/0291
                                                  709/217
2012/0249581 A1* 10/2012  Cassistat ........... G06F 17/30011
                                                  345/629
(Continued)

FOREIGN PATENT DOCUMENTS

CN    101908076 A    12/2010
CN    102799382 A    11/2012
(Continued)

OTHER PUBLICATIONS

Ben Nadel, Using jQuery's SlideUp( ) and SlideDown( ) Methods With Bottom-Positioned Elements, Jan. 25, 2010, bennadel.com /blog/, pp. 1-3.*
(Continued)

*Primary Examiner* — Frank D Mills
*Assistant Examiner* — Ahmad M El-Bkaily
(74) *Attorney, Agent, or Firm* — Anova Law Group, PLLC (57) ABSTRACT

The present disclosure is applicable to the field of browser, and it provides a method and apparatus for displaying an extended function information area. The method comprises receiving an instruction for activating the extended function information area, acquiring a location where the extended function information area is to be displayed on a page according to the instruction; adjusting layout of the page
(Continued)

according to the location and a predefined size of the extended function information area, so as to obtain a blank area on the page; and displaying the extended function information area in the blank area. According to embodiments of the present disclosure, the extended function information area is directly displayed, which enables the extended function information area to be displayed on the same layer as the page, ensures visual areas available to be browsed by users, and facilitates browsing of users.

17 Claims, 4 Drawing Sheets

(51) Int. Cl.
  *G06F 17/30* (2006.01)
  *G06F 3/0483* (2013.01)
  *G06F 3/0488* (2013.01)
(52) U.S. Cl.
  CPC ...... *G06F 3/0488* (2013.01); *G06F 17/30899* (2013.01); *G06F 2203/04803* (2013.01)

(56) References Cited

U.S. PATENT DOCUMENTS

| | | |
|---|---|---|
| 2013/0033447 A1 | 2/2013 | Cho |
| 2013/0227490 A1* | 8/2013 | Thorsander ......... G06F 3/04883 715/841 |
| 2013/0346906 A1* | 12/2013 | Farago ................ G06F 3/04883 715/776 |
| 2014/0089842 A1 | 3/2014 | Lin et al. |
| 2014/0115516 A1 | 4/2014 | Ding et al. |
| 2015/0169699 A1* | 6/2015 | Gilbert ................ G06F 3/04842 707/722 |

FOREIGN PATENT DOCUMENTS

| | | |
|---|---|---|
| CN | 102880385 A | 1/2013 |
| JP | 2008-275687 A | 11/2008 |

OTHER PUBLICATIONS

Office Action dated Nov. 21, 2016 for Chinese Application No. 201310129381.9, 13 pages.

* cited by examiner

METHOD AND APPARATUS FOR DISPLAYING AN EXTENDED FUNCTION INFORMATION AREA

RELATED APPLICATIONS

This application is a continuation of International Application No. PCT/CN2014/075100 filed on Apr. 10, 2014, which claims priority to Chinese Patent Application No. 201310129381.9 filed on Apr. 15, 2013, the contents of which are incorporated by reference herein in their entirety.

TECHNICAL FIELD

The present disclosure relates to the field of page processing, and particularly, to method and apparatus for displaying an extended function information area.

BACKGROUND ART

When a browser is used to browse pages, certain extended function information of a current page usually needs to be exhibited on interface of the current page, such as, adjustment information of display mode of the current page or setting information of the browser may probably need to be exhibited, so as to facilitate entering the corresponding editing or setting information, and performing corresponding editing and adjustment on the current page.

Figure 1:
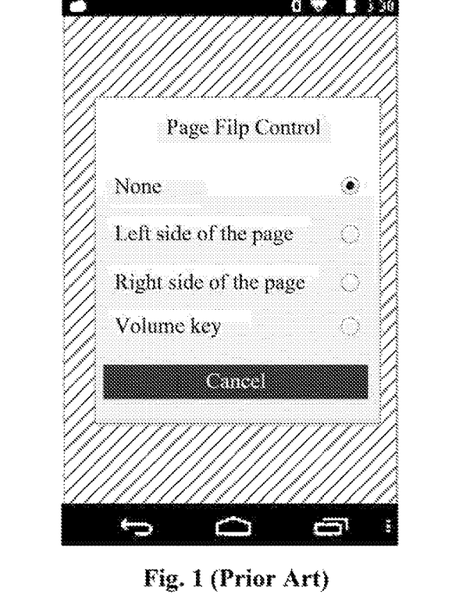
FIG. 1 is an effect schematic diagram that displays an extended function information area through a dialog box of the prior art.
Figure 2:
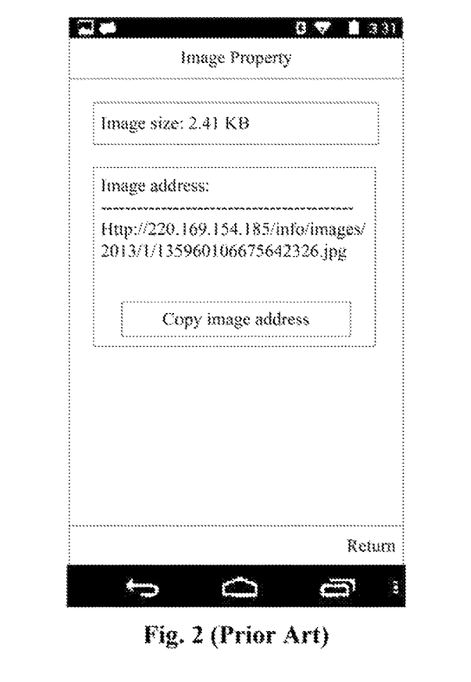
FIG. 2 is an effect schematic diagram that displays an extended function information area through a full-screen function of the prior art.

Various applications in the Android operating system or the IOS operating system at present can activate extended function information of the current page through operation instructions, such as a long press, a click, or a gesture etc., when browsing pages. A dialog box as shown in FIG. 1 or newly creating a full-screen function window as shown in FIG. 2, each of them establishes an overlaying area on an upper layer over the current page, which reduces visible areas of the page, i.e., the areas for browsing the relatively complete information of the page, and the extended function information area is separated from the current browsing scene, which is inconvenient for user operations.

SUMMARY OF THE INVENTION

The aim of embodiments of the present disclosure is to provide a method for displaying an extended function information area, for solving the problem in the prior art that when displaying an extended function information area, the visible areas of the page are small and the extended function information area is separated from the current scene, so as to improve convenience of user operations.

Embodiments of the present disclosure are implemented as a method for displaying an extended function information area, the method comprising the steps of:

receiving an instruction for activating the extended function information area, acquiring a location where the extended function information area is to be displayed on a page according to the instruction;

adjusting layout of the page according to the location and a predefined size of the extended function information area, so as to obtain a blank area on the page; and displaying the extended function information area in the blank area.

Another aim of embodiments of the present disclosure is to provide an apparatus for displaying an extended function information area, the apparatus comprising:

a receiving-acquiring unit configured to receive an instruction for activating the extended function information area, acquire a location where the extended function information area is to be displayed on a page according to the instruction;

a page adjusting unit configured to adjust layout of the page according to the location and a predefined size of the extended function information area, so as to obtain a blank area on the page; and a displaying unit configured to display the extended function information area in the blank area.

Embodiments of the present disclosure also provide a browser comprising the apparatus for displaying an extended function information area as described above.

In embodiments of the present disclosure, an instruction for activating the extended function information area is received, a location where the extended function information area is to be displayed on a page is acquired according to the instruction, and a blank area is obtained at the location where the extended function information area is to be displayed according to a predefined size of the extended function information area. Embodiments of the present disclosure, by means of acquiring a location where the extended function information area is to be displayed on a page, adjusting layout of the page according to the location and a predefined size of the extended function information area so as to obtain a blank area, and displaying the extended function information area in the blank area, enable the extended function information area to be displayed on the same layer as the page, ensure visual areas available to be browsed by users, and facilitate browsing of users.

SPECIFIC MODES FOR CARRYING OUT THE DISCLOSURE

For the purposes, the technical solutions, and the advantages of the present disclosure to be more clear and explicit, the present disclosure will be described in further detail in conjunction with the accompanying drawings and the embodiments hereinafter. As will be appreciated that, the specific embodiments described herein are merely to interpret the present disclosure, but not to limit the present disclosure.

The devices to which the method of the present disclosure is applicable usually are various mobile devices, such as touch-control devices like mobile phones, tablet computers etc., as well as other non-touch input devices. In embodiments of the present disclosure, by means of receiving an instruction for activating the extended function information area, acquiring a location where the extended function information area is to be displayed on a page according to the instruction, adjusting layout of the page according to the location and a predefined size of the extended function information area so as to obtain a blank area on the page, and displaying the extended function information area in the blank area. The extended function information area will not overlay the current page information, which thereby enables it to ensure larger visible areas, facilitates the capability that users view more information of the page that needs to be operated currently when performing operations on the extended function information area, and conveniences browsing operations of users.

First Embodiment

Figure 3:
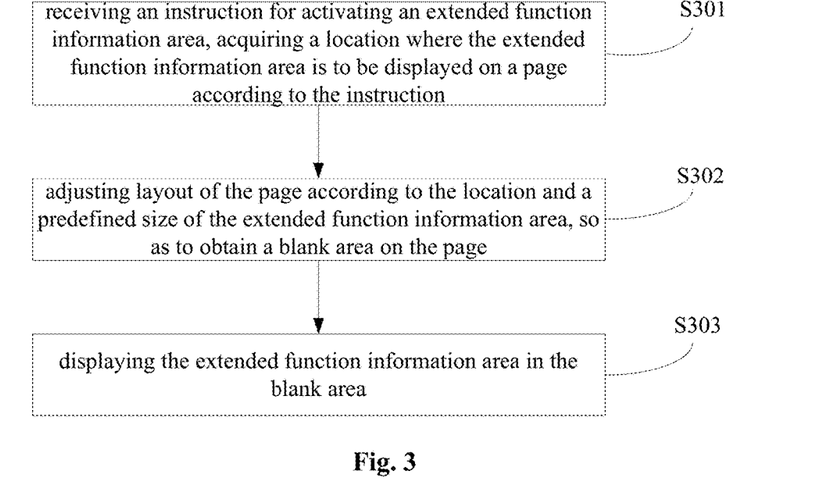
FIG. 3 is a flow chart of a method for displaying an extended function information area according to a first embodiment of the present disclosure.

FIG. 3 shows a flow chart of a method for displaying an extended function information area according to a first embodiment of the present disclosure. The details are described as follows:

In step S301, an instruction for activating the extended function information area is received, a location where the extended function information area is to be displayed on a page is acquired according to the instruction.

In particular, the instruction for activating the extended function information area may be classified into a touch instruction and a button instruction. When the received instruction is a touch instruction, a location where the extended function information area is to be displayed on a page may be correspondingly defined according to the location where the touch instruction resides; when the received instruction is a button instruction, it may be classified into an instruction input through a hardware keyboard and an instruction input through a touch button. Since the button instruction is not entered at a location on a page, a location where the extended function information area is to be displayed on a page when the button instruction is received needs to be defined in advance. According to the usage habits of people, a middle portion on a page or a bottom potion on a page may be defined as the location where the extended function information area is to be displayed on a page.

When the received instruction is a touch instruction, the following cases may be included:

1. A touch instruction of long-pressing the page to activate the extended function information area is received, the touch point of long-pressing the page is acquired as the location where the extended function information area is to be displayed on a page;

2. A touch instruction of downwardly stroking to activate the extended function information area is received, the start point position of the touch instruction of downwardly stroking is acquired as the location where the extended function information area is to be displayed on a page;

3. A touch instruction of horizontally stroking to activate the extended function information area is received, the row position where the touch instruction of horizontally stroking resides is acquired as the location where the extended function information area is to be displayed on a page.

Of course, the above three cases are only for illustration, according to the usage habits of users, it is also possible to flexibly define the location where the extended function information area is to be displayed on a page corresponding to various touch gestures, such as an oblique stroke etc., no specific limitation is made herein.

In step S302, layout of the page is adjusted according to the location where the extended function information area is to be displayed on a page and a predefined size of the extended function information area, so as to obtain a blank area on the page.

In particular, according to the location where the extended function information area is to be displayed on a page and a predefined size of the extended function information area, at least one of a upper portion of the page and a lower portion of the page at the location is slid so as to obtain a blank area on the page.

When a touch instruction is received, the touch instruction may probably appear in an upper location or a lower location on the page, the corresponding location where the extended function information area is to be displayed on a page is determined as at an upper portion or a lower portion on the page. Therefore, in order to prevent appearance of a possible situation that the extended function information area may probably be outside frames of the page, the following operation steps may be followed to execute the page sliding operation:

1. According to the location where the extended function information area is to be displayed on a page and a predefined size of the extended function information area, at least one of a upper portion of the page and a lower portion of the page at the location is slid with a predetermined ratio.

2. It is judged whether the downward sliding of lower portion of the page at the location exceeds a bottom frame of the page, or whether the upward sliding of upper portion of the page at the location exceeds a top frame of the page.

3. If yes, then sliding of the portion of the page that exceeds the page frame is stopped, and the other portion of the page that does not exceed the page frame thereof continues to complete the sliding of the corresponding distance.

Figure 4:
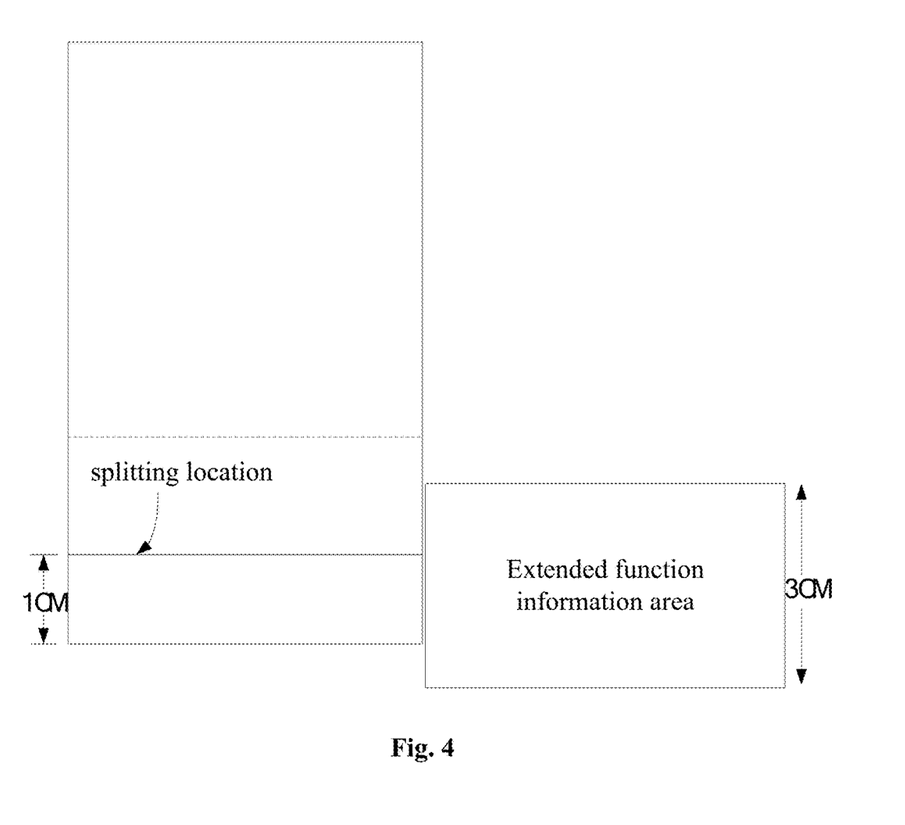
FIG. 4 is a structural schematic diagram of implementation of displaying an extended function information area within frames of a page by means of adjusting a downward sliding distance according to the first embodiment of the present disclosure.

The predetermined ratio may be 1:1, 1:0 (which means only upwardly sliding the upper portion of the page at the location where the extended function information area is to be displayed on a page), and so on. For the sake of describing the situation of exceeding frames of a page that appears when the page is slid, the following example is provided for illustration:

As shown in FIG. 4, length of the extended function information area is 3 cm, the received location where the extended function information area is to be displayed on a page is at a lower portion of the page and has a distance of 1 cm away from the bottom frame, if the predetermined ratio is 1:1, then the distance that the lower portion of the page at the location is downwardly slid is 3/2=1.5 cm, while the location is only 1 cm away from the bottom frame, so, if the lower portion of the page at the location is downwardly slid by 1.5 cm, it will make a 0.5 cm portion of the displayed extended function information area be located outside the bottom frame of the page. Thus, in order to avoid the appearance of such situation, when lower portion of the page at the location where the extended function information area is to be displayed on a page is about to be totally outside the bottom frame of the page, downward sliding of the lower portion of the page at the location where the extended function information area is to be displayed on a page is stopped, the upper portion of the page at the location where the extended function information area is to be displayed on a page continues to be slid upwardly by 0.5 cm additionally on the base of having already slid 1.5 cm originally, so that the obtained blank area meets the requirements of display of the extended function information area.

In step S303, the extended function information area is displayed in the blank area.

In particular, after layout of the page is adjusted, a blank area whose size is the same as the extended function information area is obtained, and the extended function information area is displayed in the blank area. The contents displayed by the extended function information area include pictures, buttons, texts, links, and/or audio and video information.

Figure 5:
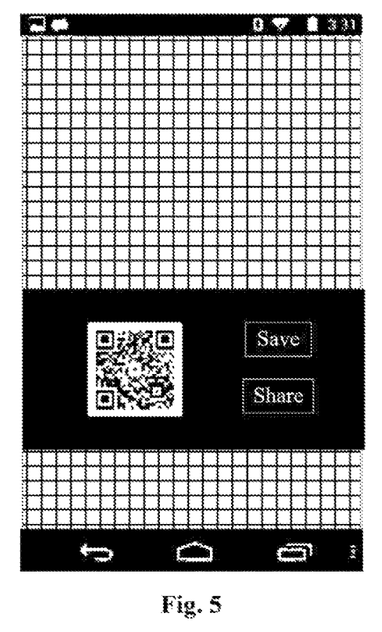
FIG. 5 is an effect schematic diagram of displaying an extended function information area by splitting a page according to an embodiment of the present disclosure.

FIG. 5 shows an effect schematic diagram of the displayed picture information and buttons.

Of course, as a consideration in terms of implementation effect, it is possible to display the extended function information area while sliding the page, thus achieving exhibition of a dynamic display process. After the extended function information area is displayed, operation instructions from a user can be received, and editing operations can be performed on the extended function information area.

In embodiments of the present disclosure, by means of receiving an instruction for activating the extended function information area, acquiring a location where the extended function information area is to be displayed on a page according to the instruction, adjusting layout of the page according to the location and a predefined size of the extended function information area so as to obtain a blank area, and displaying the extended function information area in the blank area. The extended function information area is displayed in the current page browsing scene by adjusting layout of a page, which enables the extended function information area to be displayed on the same layer as the page, ensures visual areas available to be browsed by users, and facilitates browsing of users. In addition, with respect to the situation of a portion of a page exceeding frames of the page during the sliding, the corresponding sliding distance is adjusted to the other portion of the page at the location where the extended function information area is to be displayed on the page, thus ensuring that the extended function information area is totally inside frames of the page.

Second Embodiment

Figure 6:
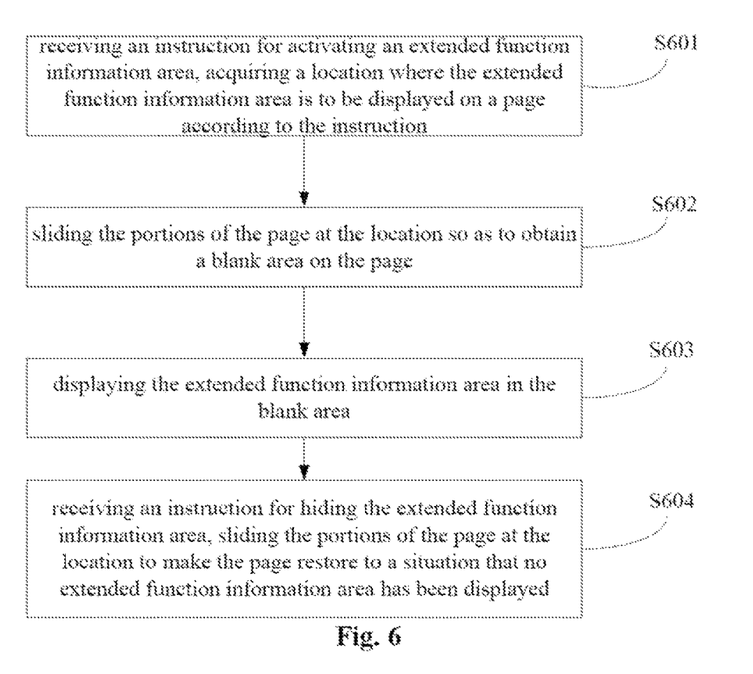
FIG. 6 is a flow chart of a method for displaying an extended function information area according to a second embodiment of the present disclosure.

FIG. 6 is a flow chart of a method for displaying an extended function information area according to a second embodiment of the present disclosure. The details are described as follows:

In step S601, an instruction for activating the extended function information area is received, a location where the extended function information area is to be displayed on a page is acquired according to the instruction.

In step S602, according to the location and a predefined size of the extended function information area, at least one of a upper portion of the page and a lower portion of the page at the location is slid so as to obtain a blank area on the page.

In step S603, the extended function information area is displayed in the blank area.

Steps S601-S603 are the same as steps S301-S303 described in the first embodiment, the details will be no more repeated herein.

In step S604, an instruction for hiding the extended function information area is received, at least one of the upper portion of the page and the lower portion of the page at the location is slid to make the page restore to a status that no extended function information area has been displayed.

In particular, the instruction for hiding the extended function information area includes clicking on a Close button of the extended function information area and touching a location in areas other than the extended function information area. As compared with clicking on a Close button of the extended function information area, touching a location in areas other than the extended function information area can further improve the convenience of usage of users.

After receiving the instruction for hiding the extended function information area, according to an operation procedure reverse to step S302, the upper portion of the page and the lower portion of the page at the location where the extended function information area is displayed on the page are slid back to the location where the extended function information is displayed on the page, i.e., sliding back to where the page is split, thus restoring to the status when no extended function information area has been displayed. Of course, as other realizable implementations, the sliding back may be performed by a ratio not consistent with the ratio of opening the extended function information area.

Embodiments of the present disclosure, by means of monitoring an instruction from interface outside the extended function information area, can more conveniently make the current extended function information area be hidden, which helps to improve convenience of user operations.

Third Embodiment

Figure 7:
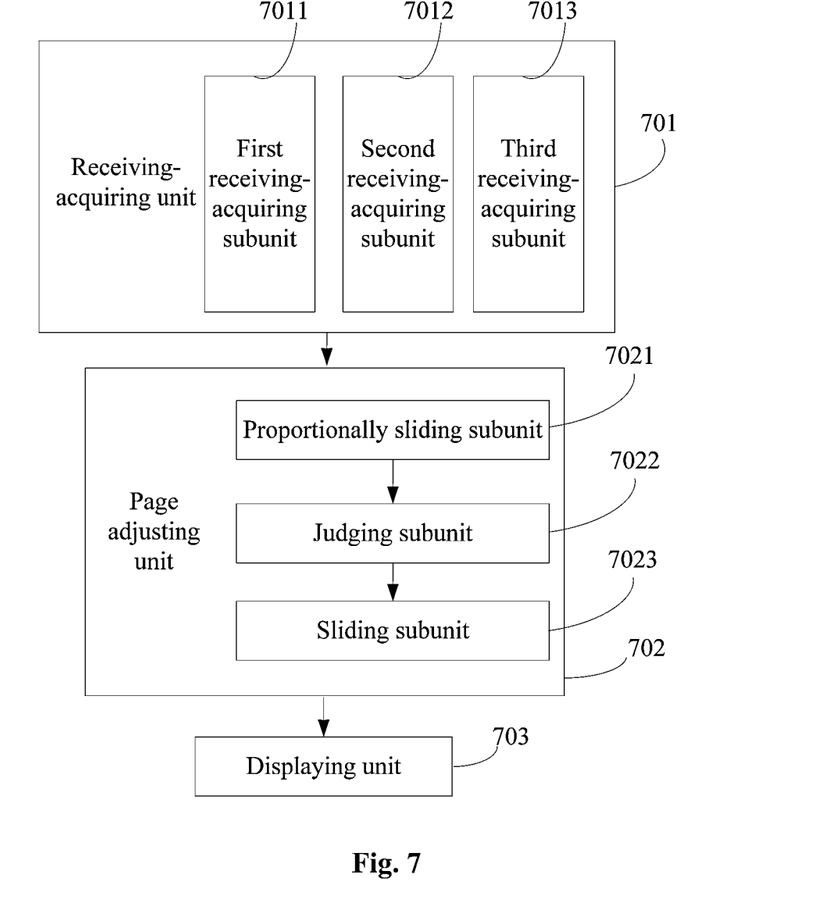
FIG. 7 is a structural schematic diagram of an apparatus for displaying an extended function information area according to an embodiment of the present disclosure.

FIG. 7 is a structural schematic diagram of an apparatus for displaying an extended function information area according to a third embodiment of the present disclosure. The details are described as follows:

The apparatus for displaying an extended function information area according to embodiments of the disclosure comprises a receiving-acquiring unit 701, a page adjusting unit 702, and a displaying unit 703.

The receiving-acquiring unit 701 is configured to receive an instruction for activating the extended function information area, acquiring a location where the extended function information area is to be displayed on a page according to the instruction.

The page adjusting unit 702 is configured to adjust layout of the page according to the location and a predefined size of the extended function information area, so as to obtain a blank area on the page.

The display unit 703 is configured to display the extended function information area in the blank area.

The page adjusting unit 702 is particularly configured to, according to the location and a predefined size of the extended function information area, slide at least one of a upper portion of the page and a lower portion of the page at the location so as to obtain a blank area on the page.

The apparatus further comprises a page restoring unit 704 configured to receive an instruction for hiding the extended function information area, slide at least one of a upper portion of the page and a lower portion of the page at the location, and thereby restoring the page to the status when no extended function information area has been displayed. In order to facilitate user operations, touching a location in areas other than the extended function information area is defined as the instruction for hiding.

As a particular implementation of the present disclosure, the receiving-acquiring unit 701 may particularly include:

a first receiving-acquiring subunit 7011 configured to receive a touch instruction of long-pressing the page to activate the extended function information area, the touch point of long-pressing the page being acquired as the location where the extended function information area is to be displayed on a page; or a second receiving-acquiring subunit 7012 configured to receive a touch instruction of downwardly stroking to activate the extended function information area, the start point position of the touch instruction of downward stroking being acquired as the location where the extended function information area is to be displayed on a page; or a third receiving-acquiring subunit 7013 configured to receive a touch instruction of horizontally stroking to activate the extended function information area, the row position where the horizontally stroking instruction resides being acquired as the location where the extended function information area is to be displayed on a page.

The page adjusting unit 702 may particularly include:
a proportionally sliding subunit 7021 configured to, according to the location and a predefined size of the extended function information area, slide the upper portion of the page and the lower portion of the page at the location with a predetermined ratio;

a judging subunit 7022 configured to judge whether the downward sliding of the lower portion of the page at the location exceeds a bottom frame of the page, or whether the upward sliding of the upper portion of the page at the location exceeds a top frame of the page; and a sliding subunit 7023 configured to, if yes, stop sliding the portion of the page that exceeds the page frame, and continuing to complete the sliding of the corresponding distance by the other portion of the page that does not exceed the page frame.

Contents displayed by the extended function information area include pictures, buttons, texts, links, and/or audio and video information.

The device embodiment of the present application corresponds to the method embodiments of the first embodiment and the second embodiment, which will not be described in detail here.

Embodiments of the present disclosure also provide a browser comprising the apparatus for displaying an extended function information area as described above.

In embodiments of the present disclosure, by means of receiving an instruction for activating the extended function information area, acquiring a location where the extended function information area is to be displayed on a page according to the instruction, sliding the upper portion of the page and/or the upper portion of the page at the location, display of the extended function information area is achieved. The extended function information area in embodiments of the present disclosure is directly displayed, by means of sliding page, at the location where the extended function information area is to be displayed on a page at the browsing scene of the current page, which enables the extended function information area to be displayed on the same layer as the page, ensures visual areas available to be browsed by users, and facilitates browsing of users.

The above described are only preferred embodiments of the present disclosure, not intended to limit the present disclosure. Any modifications, equivalent alternatives and modifications etc. made within the spirits and principles of the present disclosure should be included within the protection scope of the present disclosure.

What is claimed is:

1. A method implemented in a mobile device for displaying an extended function information area in a graphical user interface of the mobile device, the method comprising:

receiving an instruction from an input device of the mobile device for activating the extended function information area when a first page being displayed on the graphical user interface;

acquiring a location in the first page preparing to display extended function information;

adjusting a layout of the first page by inserting a blank area in the first page according to the location and a predefined size of the extended function information area; and displaying the extended function information in the blank area inserted in the first page, as a second page on the graphical user interface, wherein adjusting the layout of the first page further comprises:

according to the location, a predetermined ratio corresponding to opening the extended function information area, and the predefined size of the extended function information area, determining an upward-sliding distance corresponding to an upper portion of the first page and a downward-sliding distance corresponding to a lower portion of the first page, the upper portion and the lower portion being split at the location, wherein the predetermined ratio is a ratio between the upward-sliding distance the downward-sliding distance, and a sum of the upward-sliding distance and the downward-sliding distance is a length of the extended function information area;

sliding the upper portion of the first page upwardly and the lower portion of the first page downwardly at the location, respectively, based on the upward-sliding distance and the downward-sliding distance such that the blank area is inserted between the upper portion and the lower portion;

determining whether a downward sliding of the lower portion of the first page at the location exceeds a bottom frame of the first page by comparing the downward-sliding distance and a first distance between the location and the bottom frame; and in response to determining that the downward sliding of the lower portion of the first page at the location exceeds the bottom frame of the first page, automatically stopping the sliding of the lower portion when the lower portion of the first page reaches the bottom frame, and continuing to complete the sliding of the upper portion with a first additional distance besides the upward-sliding distance to make the blank area, the first additional distance being a difference between the downward-sliding distance and the first distance.

2. The method of claim 1, further comprising:
receiving an instruction for hiding the extended function information area, and sliding at least one of the upper portion and the lower portion at the location, to restore the displaying of the first page from the second page without displaying the extended function information area.

3. The method according to claim 1, wherein the step of receiving an instruction for activating the extended function information area comprises:

receiving a touch instruction of long-pressing the first page to activate the extended function information area, a touch point of long-pressing the first page being acquired as the location preparing to display the extended function information; or receiving a touch instruction of downwardly stroking the displayed first page to activate the extended function information area, a start point position of the touch instruction of downwardly stroking the displayed first page being acquired as the location preparing to display the extended function information; or receiving a touch instruction of horizontally stroking the displayed first page to activate the extended function information area, a row position where the horizontally stroking instruction resides being acquired as the location preparing to display the extended function information.

4. A mobile device, comprising:

an apparatus for displaying an extended function information area and being executed by the mobile device to:

receive an instruction for activating the extended function information area when a first page being displayed on the mobile device and acquire a location in the first page preparing to display the extended function information;

adjust a layout of the first page by inserting a blank area in the first page according to the location and a predefined size of the extended function information area; and display the extended function information in the blank area inserted in the first page, as a second page on the mobile device, wherein the apparatus is executed by the mobile device to, according to the location, a predetermined ratio corresponding to opening the extended function information area, and the predefined size of the extended function information area, determine an upward-sliding distance corresponding to an upper portion of the first page and a downward-sliding distance corresponding to a lower portion of the first page, the upper portion and the lower portion being split at the location, wherein the predetermined ratio is a ratio between the upward-sliding distance the downward-sliding distance, and a sum of the upward-sliding distance and the downward-sliding distance is a length of the extended function information area;

slide the upper portion of the first page upwardly and the lower portion of the first page downwardly at the location, respectively, based on the upward-sliding distance and the downward-sliding distance such that the blank area is inserted between the upper portion and the lower portion;

determine whether a downward sliding of the lower portion of the first page at the location exceeds a bottom frame of the first page by comparing the downward-sliding distance and a first distance between the location and the bottom frame; and in response to determining that the downward sliding of the lower portion of the first page at the location exceeds the bottom frame of the first page, automatically stop the sliding of the lower portion when the lower portion of the first page reaches the bottom frame, and continue to complete the sliding of the upper portion with a first additional distance besides the upward-sliding distance to make the blank area, the first additional distance being a difference between the downward-sliding distance and the first distance.

5. The device of claim 4, wherein the apparatus is executed by the mobile device to:

receive an instruction for hiding the extended function information area, and slide at least one of the upper portion and the lower portion at the location, to restore the displaying of the first page from the second page without displaying the extended function information area.

6. The device of claim 4, wherein the apparatus is executed by the mobile device to:

receive a touch instruction of long-pressing the first page to activate the extended function information area, the touch point of long-pressing the first page being acquired as the location preparing to display the extended function information; or receive a touch instruction of downwardly stroking the displayed first page to activate the extended function information area, a start point position of the touch instruction of downwardly stroking the displayed first page being acquired as the location preparing to display the extended function information; or receive a touch instruction of horizontally stroking the displayed first page to activate the extended function information area, a row position where the horizontally stroking instruction resides being acquired as the location preparing to display the extended function information.

7. A non-transitory storage medium storing computer readable instructions that, when being executed by at least one processor, cause the at least one processor to:

receive an instruction for activating the extended function information area when a first page being displayed on the mobile device and acquire a location in the first page preparing to display the extended function information;

adjust a layout of the first page by inserting a blank area in the first page according to the location and a predefined size of the extended function information area; and display the extended function information in the blank area inserted in the first page, as a second page on the mobile device, wherein the computer readable instructions further cause the at least one processor to:

according to the location, a predetermined ratio corresponding to opening the extended function information area, and the predefined size of the extended function information area, determine an upward-sliding distance corresponding to an upper portion of the first page and a downward-sliding distance corresponding to a lower portion of the first page, the upper portion and the lower portion being split at the location, wherein the predetermined ratio is a ratio between the upward-sliding distance the downward-sliding distance, and a sum of the upward-sliding distance and the downward-sliding distance is a length of the extended function information area;

slide the upper portion of the first page upwardly and the lower portion of the first page downwardly at the location, respectively, based on the upward-sliding distance and the downward-sliding distance such that the blank area is inserted between the upper portion and the lower portion;

determine whether a downward sliding of the lower portion of the first page at the location exceeds a bottom frame of the first page by comparing the downward-sliding distance and a first distance between the location and the bottom frame; and in response to determining that the downward sliding of the lower portion of the first page at the location exceeds the bottom frame of the first page, automatically stop the sliding of the lower portion when the lower portion of the first page reaches the bottom frame, and continue to complete the sliding of the upper portion with a first additional distance besides the upward-sliding distance to make the blank area, the first additional distance being a difference between the downward-sliding distance and the first distance.

8. The storage medium of claim 7, wherein the computer readable instructions further cause the at least one processor to receive an instruction for hiding the extended function information area, and slide at least one of the upper portion and the lower portion at the location, to restore the displaying of the first page from the second page without displaying the extended function information area.

9. The storage medium of claim 7, wherein the computer readable instructions further cause the at least one processor to:
receive a touch instruction of long-pressing the first page to activate the extended function information area, the touch point of long-pressing the first page being acquired as the location preparing to display the extended function information; or
receive a touch instruction of downwardly stroking the displayed first page to activate the extended function information area, a start point position of the touch instruction of downwardly stroking the displayed first page being acquired as the location preparing to display the extended function information; or
receive a touch instruction of horizontally stroking the displayed first page to activate the extended function information area, a row position where the horizontally stroking instruction resides being acquired as the location preparing to display the extended function information.

10. The method of claim 1, wherein the extended function information displayed in the blank area includes at least one of pictures, buttons, texts, links, or audio and video information.

11. The device of claim 4, wherein the extended function information displayed in the blank area includes at least one of pictures, buttons, texts, links, or audio and video information, or a combination thereof.

12. The storage medium of claim 7, wherein the extended function information displayed in the blank area includes at least one of pictures, buttons, texts, links, or audio and video information.

13. The method of claim 1, wherein adjusting the layout of the first page further comprises:
determining whether an upward sliding of the upper portion of the first page at the location exceeds a top frame of the first page by comparing the upward-sliding distance and a second distance between the location and the top frame; and
in response to determining that the upward sliding of the upper portion of the first page at the location exceeds the top frame of the first page, automatically stopping the sliding of the upper portion when the upper portion of the first page reaches the top frame, and continuing to complete the sliding of the lower portion with a second additional distance besides the upward-sliding distance to make the blank area, the second additional distance being a difference between the upward-sliding distance and the second distance.

14. The device of claim 4, wherein the apparatus is executed by the mobile device to:
determine whether an upward sliding of the upper portion of the first page at the location exceeds a top frame of the first page by comparing the upward-sliding distance and a second distance between the location and the top frame; and
in response to determining that the upward sliding of the upper portion of the first page at the location exceeds the top frame of the first page, automatically stop the sliding of the upper portion when the upper portion of the first page reaches the top frame, and continue to complete the sliding of the lower portion with a second additional distance besides the upward-sliding distance to make the blank area, the second additional distance being a difference between the upward-sliding distance and the second distance.

15. The storage medium of claim 7, wherein the computer readable instructions further cause the at least one processor to:
determine whether an upward sliding of the upper portion of the first page at the location exceeds a top frame of the first page by comparing the upward-sliding distance and a second distance between the location and the top frame; and
in response to determining that the upward sliding of the upper portion of the first page at the location exceeds the top frame of the first page, automatically stop the sliding of the upper portion when the upper portion of the first page reaches the top frame, and continue to complete the sliding of the lower portion with a second additional distance besides the upward-sliding distance to make the blank area, the second additional distance being a difference between the upward-sliding distance and the second distance.

16. The method of claim 2, wherein receiving the instruction for hiding the extended function information area comprises:
receiving a touch instruction at any location outside the extended function information area.

17. The method of claim 2, wherein sliding at least one of the upper portion and the lower portion at the location comprises:
sliding the upper portion downwardly and the lower portion upwardly by a ratio not consistent with the predetermined ratio corresponding to opening the extended function information area.

* * * * *